United States Patent [19]
Kim

[11] Patent Number: 5,579,649
[45] Date of Patent: Dec. 3, 1996

[54] AIR CONDITIONING SYSTEM FOR A VEHICLE

[75] Inventor: Seung-Wook Kim, Seoul, Rep. of Korea

[73] Assignee: Hyundai Motor Co., Ltd., Seoul, Rep. of Korea

[21] Appl. No.: 458,874

[22] Filed: Jun. 2, 1995

[30] Foreign Application Priority Data

Jun. 3, 1994 [KR] Rep. of Korea ............... 94-12958
Jun. 3, 1994 [KR] Rep. of Korea ............... 94-12959

[51] Int. Cl.⁶ .................... B60H 1/32; F25D 17/06
[52] U.S. Cl. ........................... 62/239; 62/426
[58] Field of Search ................ 62/404, 419, 429, 62/426, 239

[56] References Cited

U.S. PATENT DOCUMENTS

| | | | |
|---|---|---|---|
| 3,566,614 | 3/1971 | Imral | 62/429 |
| 4,201,064 | 5/1980 | Krug et al. | 62/239 |
| 4,658,598 | 4/1987 | Schulz | 62/239 |
| 4,702,307 | 10/1987 | Ito et al. | 165/42 |

Primary Examiner—William Doerrler
Attorney, Agent, or Firm—Birch, Stewart, Kolasch & Birch, LLP

[57] ABSTRACT

An air conditioning system for a vehicle includes an evaporator disposed at a slant at the forward space of a pair of blow fans and an elongated blow case extending from the blow fans to the evaporator respectively for accelerating the air flow, eliminating a loss of air flow, and scattering cooled air so as to maintain a pleasant and comfortable feeling in the vehicle.

5 Claims, 2 Drawing Sheets

AIR CONDITIONING SYSTEM FOR A VEHICLE

BACKGROUND OF THE INVENTION

1. Field of the Invention

The present invention relates to an air conditioning system for a vehicle, and more particularly, to an improved air conditioning system for a vehicle, which includes an evaporator disposed at a forward end of a blow fan and air guided from a blow case for allowing the air to smoothly flow without any swirl of the air, or loss of the air. Further, there is achieved a homogenous scattering of cooled air homogeneously so as to maintain a comfortable and pleasant feeling in the vehicle.

2. Description of Related Art

Various types of air conditioning systems for a vehicle are well known in the art. Generally, such conventional air conditioning systems include an evaporator disposed behind a pair of fans such that the air flow passes over the evaporator and thereafter, passes through a blow fan.

As shown in FIGS. 1 and 2, the conventional air conditioning system comprises a unit case 10, an evaporator 12 disposed at a slant within the unit case 10, and a pair of blow fans 16 operated by blower motors 14, disposed at the forward end of the evaporator 12. The blow fans 16 are disposed in a straight line with respect to each other, and also a blow case 18 is disposed around the blow fans for accelerating the air flow.

Accordingly, the conventional air conditioning system operates as follows (FIG. 2). Air is drawn by the suction power of the blow fan 16 through an inlet 11. Thereafter the air flow moves to the evaporator 12 and the blow fan 16. Finally, the air flow enters the interior of the vehicle through the blow case 18 and via an outlet 13.

However, such conventional air conditioning systems suffer from a number of problems such as, for example, there is some loss of the air flow from the inlet 11 of the unit case 10 to the outlet 13 since the evaporator 12 is located at the backward or inlet side of the blow fan 16, it is difficult to obtain a sufficient cool down effect, and it is difficult to maintain a pleasant and comfortable feeling for a driver and passengers.

SUMMARY OF THE INVENTION

Accordingly, it is an object of the present invention to provide an air conditioning system for a vehicle, which eliminates the above problems encountered with the conventional vehicle air conditioning systems.

Another object of the present invention is to provide an improved air conditioning system for a vehicle, which includes a unit case, a pair of blow fans and blow motors disposed in the unit case, and an evaporator disposed at a slant in the forward space of the blow fans which have a blow case disposed therearound respectively for smoothly accelerating the air flow in a unit case without any swirl of the air flow, thereby eliminating loss of the air flow, and effectively scattering cooled air homogeneously so as to maintain a pleasant and comfortable feeling in the vehicle.

A further object of the present invention is to provide an improved air conditioning system for a vehicle, which further includes an evaporator forwardly or backwardly slanted within the forward space of the blow fans which have an elongated tubular blow case respectively extending from the blow fans to the evaporator for maintaining a pleasant and comfortable feeling in the seat area of the vehicle.

Still another object of the present invention is to provide an air conditioning system for a vehicle which is simple in structure, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an air conditioning system for a vehicle, which includes an evaporator forwardly or backwardly slanted within the forward space of a pair of blow fans, and elongated blow cases extending from the blow fans to the evaporator for smoothly accelerating the air flow, thereby eliminating loss of air flow, and scattering cooled air so as to maintain a pleasant and comfortable feeling in the vehicle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
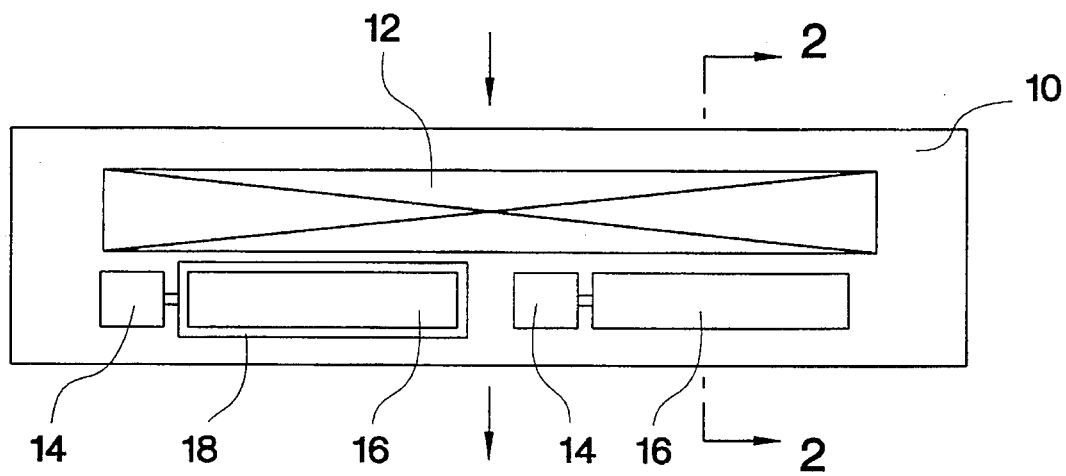
FIG. 1 is a partially diagrammatic top plan view of a conventional air conditioning system for a vehicle.
Figure 2:
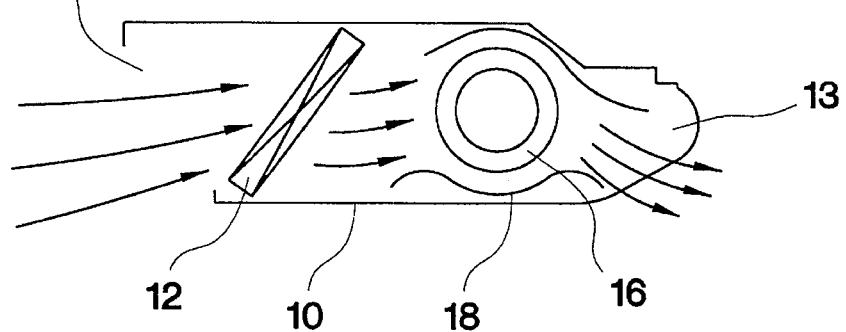
FIG. 2 is a sectional view of taken along line 2—2 of FIG. 1.
Figure 3:
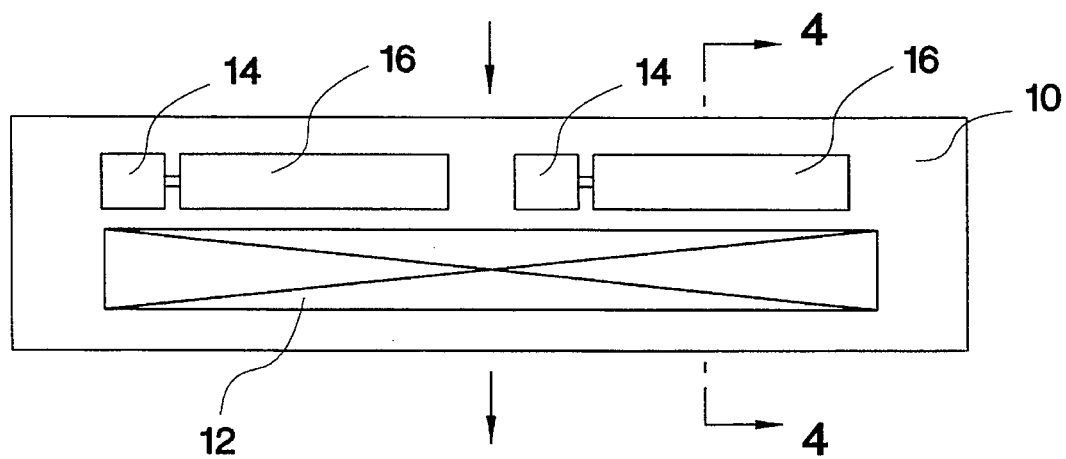
FIG. 3 is a partially diagrammatic top plan view of an air conditioning system for a vehicle according to the present invention.
Figure 4:
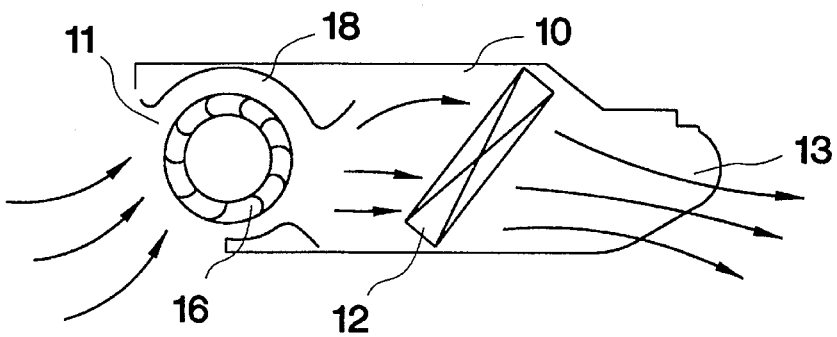
FIG. 4 is a sectional view taken along line 4—4 of FIG. 3.
Figure 5:
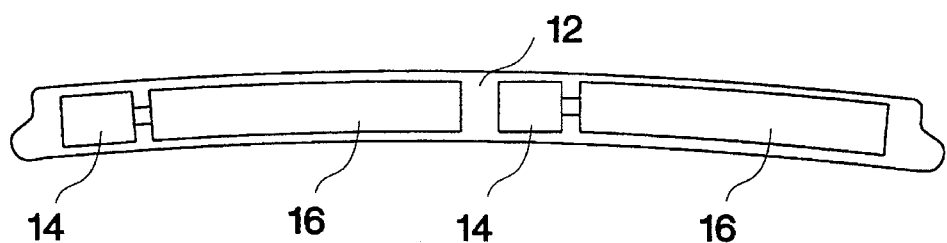
FIG. 5 is a front elevational view of the air conditioning system for a vehicle according to the present invention.

Referring now in detail to the drawings for the purpose of illustrating preferred embodiments of the present invention, the air conditioning system for a vehicle as shown in FIGS. 3, 4 and 5, comprises a unit case 10, a pair of blow fans 16 and blow motors disposed in the unit case 10, and forwardly slanted evaporators 12 disposed at a forward or exhaust side of the blow fans 16, and a blow case 18 disposed around each blow fan 16 for smoothly accelerating the air flow. An air inlet 11 and an air outlet 13 are disposed in advance of the blow fan 11 and subsequent to the evaporator 12, respectively.

As shown in FIG. 5, the pair of blow fans 16 are operated by the pair of blow motors 14, respectively. Also, one blow fan 16 and blow motor 14 are disposed in alignment with another blow fan 16 and blow motor 14.

As shown in FIG. 4, the air conditioning system for a vehicle of the present invention operates as follows. When the air conditioning system operates, the blow fans 16 rotate by operating the blow motors 14. Therefore, the air flow is exhausted from the air outlet 13 after being drawn through the air inlet 11 and passing through the blow fans 16 and the evaporator 12.

Thus, since the air conditioning system according to the present invention includes the evaporator 12 disposed at the exhaust side of the blow fans 16 and the blow case 18, first of all, the air flow passes the blow fans 16 and thereafter the air flow accomplishes the heat exchange at the evaporator 12. Therefore, the cooling air smoothly scatters into the seat area in the vehicle through the air outlet 13 in the direction indicated by arrows as shown in FIG. 4. At this time, the air conditioning system of the present invention does not generate the swirl of the air flow, and eliminates loss of the air flow and delivers cooled air homogeneously when compared with the conventional air conditioning system.

Figure 6:
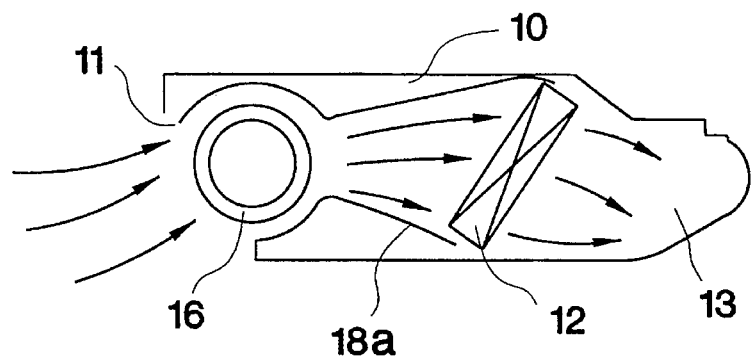
FIG. 6 is a sectional view of a second embodiment of the present invention showing a forwardly slanted evaporator and an elongated tubular blow case thereof.

Referring to FIG. 6, there is a second embodiment of an air conditioning system for a vehicle. The air conditioning system for a vehicle according to the present invention includes a forwardly slanted evaporator 12 and elongated tubular blow cases 18a extending from the blow fans 16 to the evaporator 12, whereby the air conditioning system smoothly accelerates the air flow without swirl of the air flow, thereby preventing loss of air flow, and scatters cooled air down into the seat area of the vehicle so as to maintain a pleasant and comfortable feeling for the driver and passengers.

Figure 7:
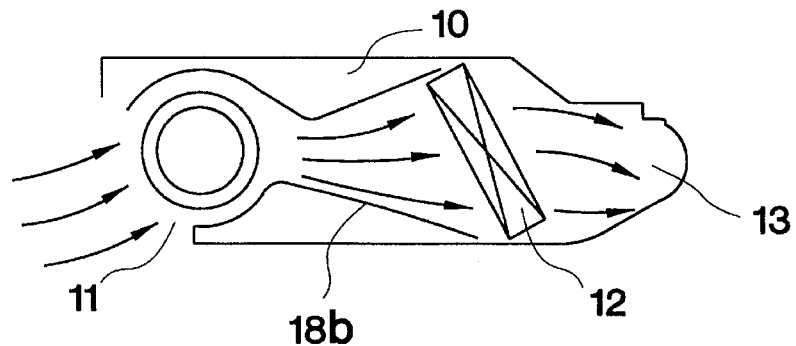
FIG. 7 is a sectional view of a third embodiment of the present invention showing a backwardly slanted evaporator and an elongated tubular case thereof.

Referring to FIG. 7, there is shown a third embodiment of an air conditioning system for a vehicle. The air conditioning system for a vehicle according to the present invention includes a backwardly slanted evaporator 12 and elongated tubular blow cases 18b extending from the blow fans 16 to the evaporator 12 whereby the air conditioning system smoothly accelerates the air flow without swirl of the air flow, thereby preventing a loss of air flow, and scatters cooled air down into the seat area of the vehicle so as to maintain a pleasant and comfortable feeling for the driver and passengers.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An air conditioning system for a vehicle, said air conditioning system comprising:

a unit case;

a pair of blow fans and blow motors disposed within said unit case, said pair of blow fans and blow motors being positioned in a straight line;

an evaporator disposed at an exhaust side of said blow fans, said evaporator being slanted for accelerating the air flow and effectively exchanging heat therethrough;

an elongated tubular blow case separately formed within said unit case and extending from said blow fans to said evaporator; and an air inlet disposed at an intake side of said blow fans and an air outlet disposed at the exhaust side of said blow fans and forward of said evaporator, whereby upon operating the air conditioning system and the blow fans and motors, the air flow from the air inlet flows smoothly, is constantly maintained and homogeneously cools a seat area of the vehicle by scattering cooled air therein.

2. The air conditioning system for a vehicle according to claim 1, wherein said evaporator is backwardly slanted toward the air inlet for accelerating the air flow and effectively exchanging heat therethrough.

3. The air conditioning system for a vehicle according to claim 1, wherein said evaporator is forwardly slanted toward the air outlet for accelerating the air flow and effectively exchanging heat therethrough.

4. The air conditioning system for a vehicle according to claim 1, wherein said elongated tubular blow case controls a quantity of blown air therethrough.

5. The air conditioning system for a vehicle according to claim 1, wherein the air inlet and the air outlet are arranged to substantially correspond to a longitudinal axis of the vehicle.

* * * * *